US010039678B2

(12) United States Patent
Mackert

(10) Patent No.: US 10,039,678 B2
(45) Date of Patent: Aug. 7, 2018

(54) SEATING FURNITURE CHASSIS

(71) Applicant: Innotec Motion GmbH, Lippstadt (DE)

(72) Inventor: Michael Mackert, Ruethen (DE)

(73) Assignee: INNOTEC MOTION GMBH, Lippstadt (DE)

(*) Notice: Subject to any disclaimer, the term of this patent is extended or adjusted under 35 U.S.C. 154(b) by 24 days.

(21) Appl. No.: 15/340,765

(22) Filed: Nov. 1, 2016

(65) Prior Publication Data

US 2017/0119605 A1 May 4, 2017

(30) Foreign Application Priority Data

Nov. 3, 2015 (DE) .................... 20 2015 105 851 U

(51) Int. Cl.

*A47C 1/00* (2006.01)
*A61G 15/00* (2006.01)
*B60N 2/00* (2006.01)
*B60N 2/02* (2006.01)
*A61G 5/14* (2006.01)
*A47C 7/50* (2006.01)

(52) U.S. Cl.

CPC . *A61G 5/14* (2013.01); *A47C 7/50* (2013.01)

(58) Field of Classification Search

CPC .... A61G 5/14; A47C 7/50; A47C 3/24; A47C 3/245; A47C 3/20
USPC ................................ 297/330, 344.15–344.17
See application file for complete search history.

(56) References Cited

U.S. PATENT DOCUMENTS

| | | | | |
|---|---|---|---|---|
| 4,557,454 | A | 12/1985 | Urella | |
| 5,556,163 | A | 9/1996 | Rogers, III et al. | |
| 5,803,547 | A * | 9/1998 | Brown | A47C 3/18 297/217.1 |
| 7,163,263 | B1 | 1/2007 | Kurrasch et al. | |
| 7,775,592 | B2 | 8/2010 | Becker | |
| 7,971,937 | B2 | 7/2011 | Ishii | |
| 2012/0222510 | A1 | 9/2012 | Winther et al. | |
| 2013/0200665 | A1 | 8/2013 | Stanic et al. | |
| 2016/0206099 | A1 * | 7/2016 | Robertson | A47C 1/03294 |

OTHER PUBLICATIONS

Co-pending, co-owned U.S. Appl. No. 15/340,780, filed Nov. 1, 2016.

* cited by examiner

*Primary Examiner* — Mark R Wendell
(74) *Attorney, Agent, or Firm* — Cohen & Hildebrand, PLLC

(57) ABSTRACT

A seating furniture chassis including: a lever mechanism (2) for raising and lowering a seat face of a seating furniture item; a connecting mechanism (4) for connecting the lever mechanism (2) to the seat face; and a drive mechanism (3) for actuating the lever mechanism (2). A plane is defined by way of the connecting mechanism (4), in which plane the seat face lies in the mounted state. The seating furniture chassis (1) has a clearance below the plane, which clearance is free from the lever mechanism (2) and the drive mechanism (3). A footrest of the seating furniture item is pivotable into the clearance.

10 Claims, 1 Drawing Sheet

SEATING FURNITURE CHASSIS

This is an application claiming priority to DE 20 2015 105 851.9, filed on Nov. 3, 2015, which is incorporated by reference in its entirety.

BACKGROUND OF THE INVENTION

The present invention relates to a seating furniture chassis having a lever mechanism for raising and lowering a seat face according to the precharacterizing clause of Claim 1.

Seating furniture chassis of this type are used to facilitate standing up from and sitting down on a seating furniture item for persons who are old and/or disabled physically. If the person wishes to stand up, the seat face is raised up and is inclined slightly forwards, with the result that the person can stand up more easily. If the person wishes to sit down again, he/she can sit on the seat face which is raised up and is inclined forwards, and can subsequently lower the seat face, in order to pass into a comfortable seating position.

The seating furniture chassis which are known from the prior art have the disadvantage that they have not been able to be used in combination with a foot rest of the seating furniture item which can be folded in and folded out, on account of the components which are required for raising up and lowering the seat face such as a motor and a lever mechanism, which footrest is arranged below the seat face and approximately parallel to the seat face in the folded-in state. The lever mechanism and/or the motor are/is arranged where the footrest would have to be arranged in the folded-in state.

BRIEF SUMMARY OF THE INVENTION

In contrast, the present invention is based on the object of providing a seating furniture chassis with a lever mechanism for raising and lowering a seat face of a seating furniture item, which seating furniture chassis can be used in combination with a footrest which can be folded in and folded cut and is arranged below the seat face in the folded-in state. Moreover, a system having a seating furniture chassis of this type and a seat face is to be provided.

The said object is achieved by way of a seating furniture chassis according to Claim 1 and by way of a system according to Claim 8. Embodiments of the invention are specified in the dependent claims.

The seating furniture chassis comprises a lever mechanism for raising and lowering a seat face of a seating furniture item, connecting means for connecting the lever mechanism to the seat face, and drive means for actuating the lever mechanism. A plane is defined by way of the connecting means, in which plans the seat face lies in the mounted state. Moreover, the seating furniture chassis comprises a clearance below the plane. Here, a clearance is understood to mean a region which is free from components of the seating furniture chassis. In particular, the clearance is free from the lever mechanism and the drive means. Both the lever mechanism and the drive means are therefore arranged outside the clearance.

It is provided according to the invention that a footrest of the seating furniture item can be pivoted into the clearance. As a result of the said arrangement and size of the clearance, the seating furniture chassis can be used in a seating furniture item, the footrest of which is arranged below the seat face in the folded-in state.

According to one embodiment of the invention, the footrest can be arranged in the clearance approximately parallel to the seat face. This makes it possible that the seating furniture chassis can be used in a seating furniture item, the footrest of which is arranged below the seat face approximately parallel to the seat face in the folded-in state.

According to one embodiment of the invention, the clearance can be arranged in a front region, in particular in a front half, of the seating furniture chassis.

According to one embodiment of the invention, the lever mechanism can be configured to incline the seat face during a raising operation and during a lowering operation. As a result, sitting down and standing up are facilitated, in particular, for physically disabled persons.

According to one embodiment of the invention, the lever mechanism can be configured to incline the seat face in such a way that a front edge of the seat face is lower than a rear edge of the seat face.

According to one embodiment of the invention, the connecting means can be configured for connecting the lever mechanism to different seat faces. The said embodiment has the advantage that the seating furniture chassis can be used in an adaptive manner in combination with different seat faces.

The system comprises a seating furniture chassis according to one embodiment of the invention and a seat face. The seat face can be fastened to the connecting means in such a way that it is connected via the connecting means to the lever mechanism.

According to one embodiment of the invention, the system comprises a footrest, moreover. The footrest can be capable of being pivoted into the clearance below the seat face. In the pivoted-in state, the footrest can be arranged approximately parallel to the seat face. Here, the expression "approximately parallel" is understood to mean within the context of this description, in particular, that an angle between an imaginary extension of the footrest and the seat face is less than 20°, preferably less than 10°.

BRIEF DESCRIPTION OF THE DRAWINGS

Further features and advantages of the present invention will become clear using the following description of preferred exemplary embodiments with reference to the appended drawings. Here, the same reference numerals are used for identical or similar components and for components with identical or similar functions. In the figures.

DETAILED DESCRIPTION OF THE INVENTION

The seating furniture chassis 1 comprises a lever mechanism 2, a drive means 3 and connecting means 4. The connecting means 4 are connected to the lever mechanism 2. A seat face (not shown in the figures) can be attached to the connecting means 4. The lever mechanism 2 is connected to the connecting means 4 in such a way that the lever mechanism 2 is configured to raise and lower the seat face. Moreover, the lever mechanism 2 is connected to the drive means 3 which can be, for example, a motor. The drive means 3 is configured to actuate the lever mechanism 2.

Upon an actuation of the lever mechanism 2 by way of the drive means 3, the connecting means 4 are raised or lowered. Moreover, an inclination of the connecting means 4 is achieved. In the case of a raising operation, the rear ends of the connecting means 4 are raised up to a greater extent than the front ends. Here, the rear ends are shown on the right in the figures. The drive means 3 is arranged in the rear region of the seating furniture chassis. In the case of a lowering operation, the rear ends of the connecting means 4 are lowered to such an extent that they are oriented approximately parallel to the floor in the completely lowered state.

Figure 1:
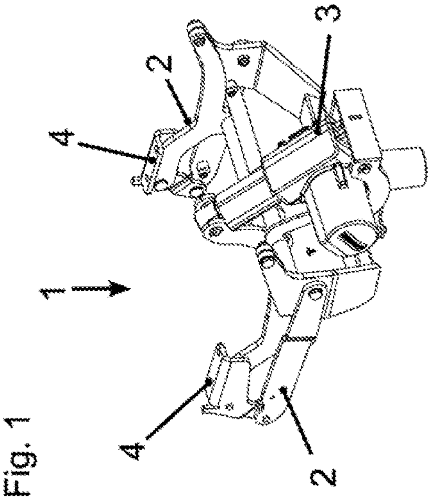
FIG. 1 shows a diagrammatic perspective view of a seating furniture chassis according to one embodiment of the invention in a first position.
Figure 2:
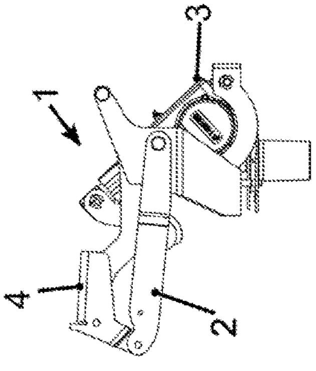
FIG. 2 shows a diagrammatic side view of the seating furniture chassis from FIG. 1 in the first position.
Figure 3:
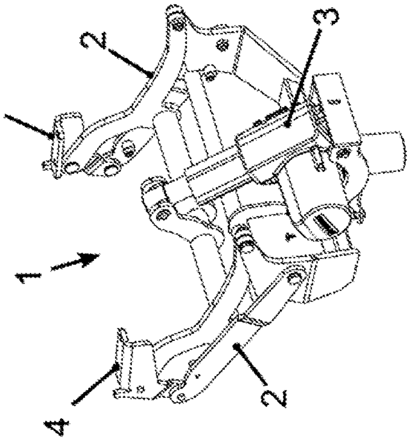
FIG. 3 shows a diagrammatic perspective view ox the seating furniture chassis from FIG. 1 in a second position.
Figure 4:
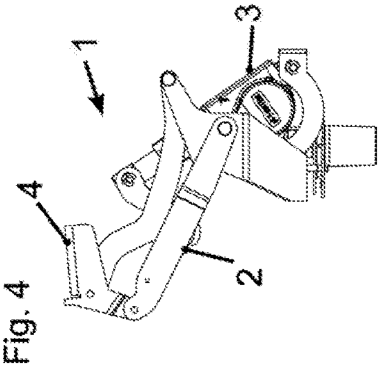
FIG. 4 shows a diagrammatic side view of the seating furniture chassis from FIG. 3 in the second position.
Figure 5:
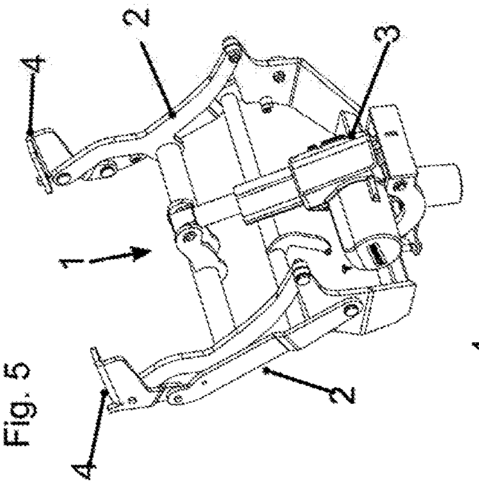
FIG. 5 shows a diagrammatic perspective view of the seating furniture chassis from FIG. 3 in a third position.
Figure 6:
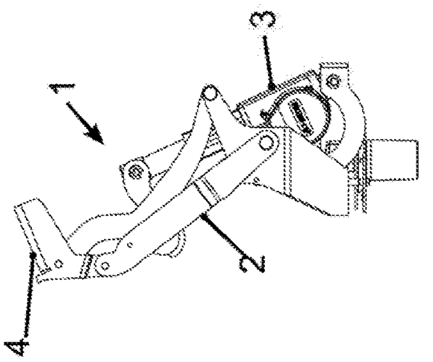
FIG. 6 shows a diagrammatic side view of the seating furniture chassis from FIG. 5 in the third position.

The completely lowered state of the connecting means 4 is shown in FIGS. 1 and 2. The completely raised state is shown in FIGS. 5 and 6. FIGS. 3 and 4 show an intermediate position which is intended to clarify the raising and lowering mechanism.

It is to be noted that the seating furniture chassis 1 has a clearance in the front region below the connecting means between two outer elements of the lever mechanism in every position, into which clearance a footrest of the seating furniture item can pivot. This has the advantage that the seating furniture chassis 1 can be used in combination with a footrest which can be pivoted in below the seat face and is arranged there approximately parallel to the seat face. A footrest of this type is also called a folded-under footrest.

The clearance is free from the lever mechanism 2 which delimits the clearance towards the outside, and from the drive means 3 which is arranged in a rear region of the seating furniture chassis 1.

Moreover, the connecting means 4 are configured in such a way that they can be connected to different seat faces. This increases the flexibility of the seating furniture chassis 1.

Every issued patent, pending application, publication, journal article, book or any other reference cited herein is each incorporated by reference in their entirety.

The invention claimed is:

1. A seating furniture chassis (1), comprising: a lever mechanism (2) for raising and lowering a seat face of a seating furniture item configured so that the seat face is sittable on by a user, a connection mechanism (4) for connecting the lever mechanism (2) to the seat face, and a drive mechanism for actuating the lever mechanism (2), wherein a plane is defined by way of the connection mechanism (4), in which plane the seat face lies in a mounted state, wherein the seating furniture chassis (1) has a clearance below the plane, a footrest of the seating furniture item is pivotable into the clearance, wherein the footrest is positionable in the clearance approximately parallel to the seat face.

2. The seating furniture chassis (1) according to claim 1, wherein the clearance is arranged below the plane both in a raised and in a lowered state of the seat face.

3. The seating furniture chassis (1) according to claim 1, wherein the clearance is arranged in a front region of the seating furniture chassis (1).

4. The seating furniture chassis (1) according to claim 3, wherein the clearance is arranged in a front half of the seating furniture chassis (1).

5. The seating furniture chassis (1) according to claim 1, wherein the lever mechanism (2) is configured to incline and raise up the seat face during a raising operation and during a lowering operation.

6. The seating furniture chassis (1) according to claim 5, wherein the lever mechanism (2) is configured to incline the seat face during the raising operation in such a way that a front edge of the seat face is lower than a rear edge of the seat face.

7. The seating furniture chassis (1) according to claim 1, wherein the connecting mechanism (4) is configured for connecting the lever mechanism (2) to different seat faces.

8. A system, comprising a seating furniture chassis (1) according to claim 1 and the seat face, wherein the seat face is connected to the connecting mechanism (4).

9. The system according to claim 8, further comprising the footrest.

10. The seating furniture chassis (1) according to claim 1, wherein the clearance is free from the lever mechanism (2) and the drive mechanism (3).

* * * * *